UNITED STATES PATENT OFFICE.

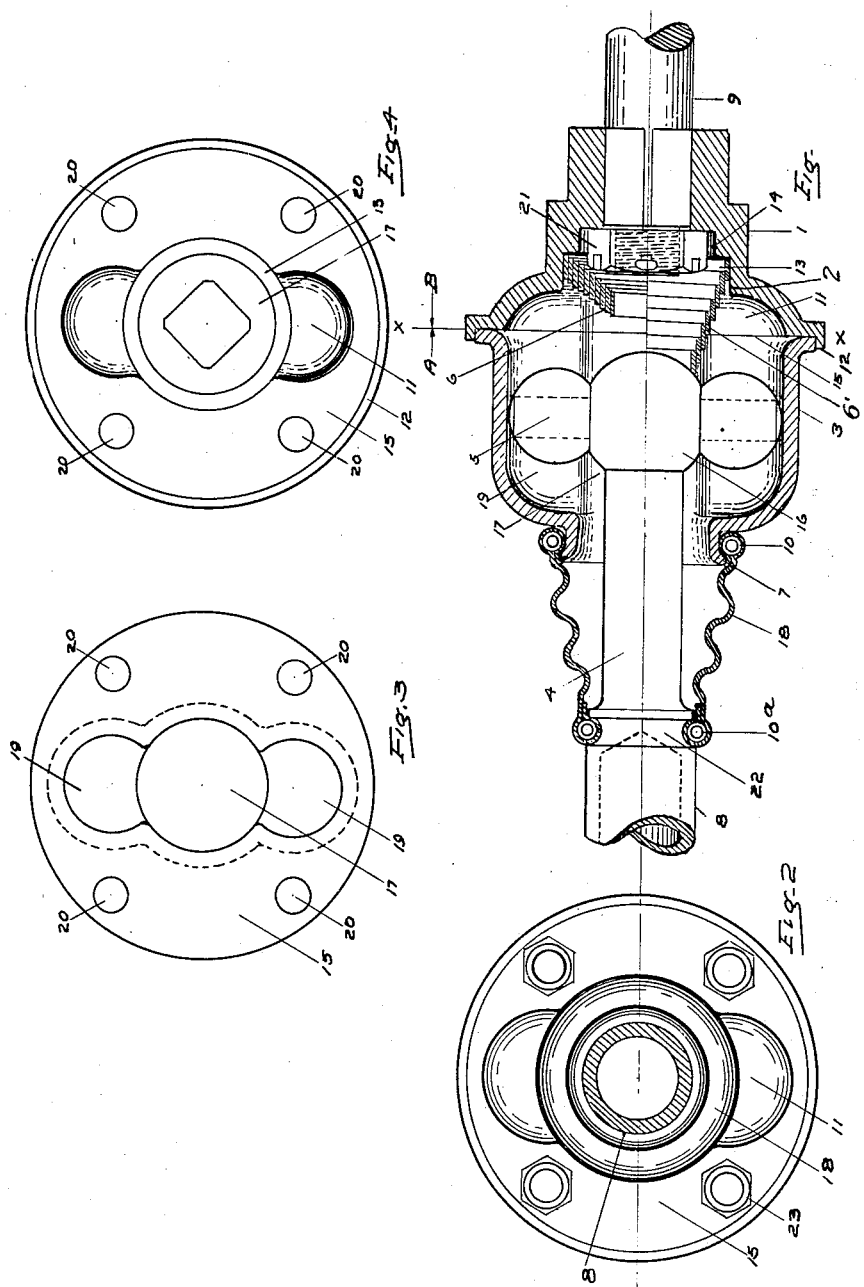

VICTOR LEE EMERSON, OF ALEXANDRIA, VIRGINIA, ASSIGNOR TO ANNETTE E. EMERSON, OF ALEXANDRIA, VIRGINIA.

UNIVERSAL JOINT.

1,183,064.  Specification of Letters Patent.  Patented May 16, 1916.

Application filed December 22, 1914. Serial No. 878,531.

*To all whom it may concern:*

Be it known that I, VICTOR LEE EMERSON, a citizen of the United States, residing at Alexandria, State of Virginia, have invented certain new and useful Improvements in Universal Joints, of which the following is a specification.

Among the objects of my invention is the construction of a universal joint which is light, compact in form, cheap to manufacture, oil-tight, dust proof, of few parts and easy to assemble. Also where parts have heretofore been made of castings or cut from solid material to reduce such parts to a form in which they can be made of drop forgings and die-pressed metal.

Figure 1 is a cross sectional view of the assembled universal joint. Fig. 2 is an end view of the assembled joint. Fig. 3 is a view of the body piece on line $x$—$x$ looking in the direction of the arrow B. Fig. 4 is an end view of the flanged coupling on line $x$—$x$ looking in the direction of the arrow A.

At 1 is shown the body of the flanged coupling having a recess 2 for a spring. A body piece is shown at 3 for carrying a rotatable member 4.

The numeral 5 indicates ball members mounted upon the member 4 and traveling in bores 19 of the body piece 3.

6 indicates a section of the spring in a collapsed position, or in the position it assumes when the ball head member 16 is thrust to the full forward position.

6' indicates the position of the spring in a partly extended position. The object of this spring is to properly distance the drive shaft 4 when a joint of this character is used on both ends of a shaft. The spring is not necessary when but one joint is used as in the case when one end of the shaft is located permanently.

Numeral 7 indicates a projection on the body piece with an edge turned outward so that a groove is formed between the edge and the body in which groove a boot 18 of leather or other flexible material is held in position by a coil spring 10. A coil spring is shown in this connection but other forms of flexible members suitable for the purpose could be used.

8 indicates a hollow shaft attached to the rotating member 4 either by electric welding or other suitable means or may be made solid therewith if desired. This shaft has a groove 22 therein for the reception of the end of a dust boot which is retained in said groove by spring 10ª.

At 9 is shown the driving shaft connection with the flanged coupling which shaft is held in place by a nut 21 in the recess or counter-bore 14. The flange 15 has formed therein depressions 11 for the purpose of stiffening the flange and allowing the ball members 5 greater latitude of travel.

12 indicates a projection on the flange 15 in which is centered the pressed metal body 3.

13 indicates the bottom of the spring resting in the recess 2.

The ball-shaped head 16 carries the ball members 5 which are mounted on a spindle shown by dotted line. Body member 3 has bores 17 and 19 to receive the head 16 and ball members 5. As will be seen, these bores are formed with continuous walls which are die-pressed from a single piece of metal. The body piece 3 has a flange thereon which is secured to the flange 15 by bolts 23 passing through registering holes 20. This body piece 3 is such a design as to be drawn from sheet metal leaving the circular form 7 at one end connecting the bores and the flange 15 turned over at right angles with the bores at the other end so as to form a bracing to resist the torque due to the rotation of the driving and driven members for the purpose of attaching the body to the flanged coupling. The bores of the body as herein shown form receptacles for one of the rotating members.

While the bores or receptacles herein shown are of cylindrical form, it is obvious that they could be made of various forms to suit the character and form of the members working therein.

What I claim is:

1. In a universal joint, the combination of driving and driven members, a flanged coupling connected to one of said members, a body member having receptacles for receiving one of said members and provided with a flange at one end adapted to mate with said flanged coupling and having the opposite end contracted into an annular projection provided with a groove, a flexible dust cover, and elastic means for holding a portion of said cover in said groove, said cover having means for retaining said elastic means in connection therewith.

2. In a universal joint, in combination, a body member provided with receptacles for the reception of a rotatable member, a flanged coupling provided with means for receiving a rotatable shaft and connected to said body member, said flanged coupling being recessed below the flanged surface thereof and having depressed portions of similar cross sectional contour to said receptacles and mating with the same to give greater longitudinal clearance to said rotatable member, and a retaining nut on said rotatable shaft and situated within said recess.

3. In a universal joint, in combination, a body member provided with receptacles having axes parallel to the axis of said body member to receive a rotatable member, said rotatable member having members contacting with said receptacles and having a longitudinal movement therein, and a flanged coupling bolted to said body and having depressions therein in alinement with said receptacles and extending on the face of said flange, beyond the radial line of said bolts and between the same.

4. In a universal joint in combination, a body member having a groove on one end, a rotatable shaft carried by said body member, a groove on said rotatable shaft, and a dust cover between said body member and said shaft, elastic means adapted to retain portions of said cover in said grooves, said cover having means to retain said elastic means in connection therewith, whereby said cover is held between said shaft and body.

5. As an article of manufacture, a pressed metal body for the purpose described, having receptacles whose exterior contour is similar to the interior contour thereof and whose axes are parallel to the axis of said body, and having a flange at the end of said receptacles extending at an angle to the axis thereof, forming an attaching member for said body.

6. As an article of manufacture, a pressed metal body for the purpose described, having receptacles whose exterior contour is similar to the interior contour thereof and whose axes are parallel to the axis of said body, said receptacles forming a structure which has greater and lesser axial diameters, and having a flange formed at one end and means for attachment disposed therein on opposite sides of the greater diameter of said structure.

7. As an article of manufacture, a pressed metal body for the purpose described, having intersecting circular receptacles with continuous walls whose exterior contour is similar to the interior contour thereof and whose axes are parallel to the axis of said body, said receptacles forming a structure which has greater and lesser axial diameters, and having a flange formed at one end and means for attachment disposed therein on opposite sides of the greater diameter of said structure, the other end of said body having an annular projection formed with an outwardly turned edge at the extremity thereof.

In testimony whereof I affix my signature in presence of two witnesses.

VICTOR LEE EMERSON.

Witnesses:
LAWRENCE S. PADDOCK,
H. E. DUNHAM.